United States Patent
Bauer et al.

[11] 3,711,468
[45] Jan. 16, 1973

[54] 3,3-DIHYDROXY-5-ARYL-1H-1,5-BENZODIAZEPINE-2,4-(3H,5H)-DIONES AND THEIR ANHYDROUS 2,3,4-TRIONE FORM

[75] Inventors: Adolf Bauer, Ingelheim/Rhine; Karl Heinz Weber, Gau-Algesheim; Peter Danneberg, Ockenheim; Klaus Minck, Gau-Algesheim, all of Germany

[73] Assignee: Boehringer Ingelheim G.m.b.H., Ingelheim am Rhine, Germany

[22] Filed: Jan. 26, 1972

[21] Appl. No.: 221,072

[30] Foreign Application Priority Data

Jan. 27, 1971 Germany..................P 21 03 744.5

[52] U.S. Cl..............260/239.3 B, 424/244, 424/263
[51] Int. Cl. ...........................................C07d 53/04
[58] Field of Search ...............................260/239.3 B

[56] References Cited

UNITED STATES PATENTS 3,660,381   5/1972   Weber et al.....................260/239.3 B Primary Examiner—Henry R. Jiles
Assistant Examiner—Robert T. Bond
Attorney—Nelson Littell et al

[57] ABSTRACT

Compounds of the formula

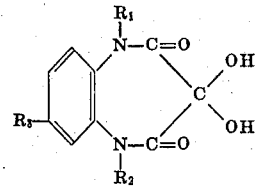

wherein $R_1$ is hydrogen, straight or branched alkyl of one to four carbon atoms, $\omega$-hydroxy-(alkyl of one to four carbon atoms) or allyl, $R_2$ is phenyl, halo-phenyl, hydroxy-phenyl, trifluoromethyl-phenyl, nitro-phenyl or pyridyl, and $R_3$ is fluorine, chlorine, bromine, trifluoromethyl or nitro, and their anhydrous 2,3,4-trione analogs of the formula

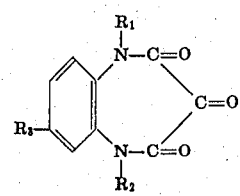

wherein $R_1$, $R_2$ and $R_3$ have the meanings defined above; the compounds are useful as tranquilizers and anticonvulsives, and also as intermediates for the preparation of other 1H-1,5-benzodiazepine-2,4-[3H,5H]-diones.

6 Claims, No Drawings

3,3-DIHYDROXY-5-ARYL-1H-1,5-BENZODIAZEPINE-2,4-(3H,5H)-DIONES AND THEIR ANHYDROUS 2,3,4-TRIONE FORM

This invention relates to novel 3,3-dihydroxy-5-aryl-1H-1,5-benzodiazepine-2,4-[3H,5H]-diones and their anhydrous 2,3,4-trione analogs, as well as to methods of preparing these compounds.

More particularly, the present invention relates to a novel class of compounds represented by the formula

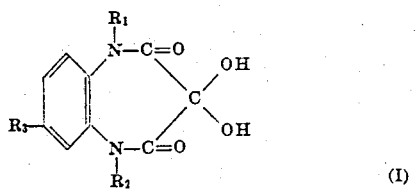

wherein $R_1$ is hydrogen, straight or branched alkyl of one to four carbon atoms, ω-hydroxy-(alkyl of one to four carbon atoms) or allyl, $R_2$ is phenyl, halo-phenyl, hydroxy-phenyl, trifluoromethyl-phenyl, nitro-phenyl or pyridyl, and $R_3$ is fluorine, chlorine, bromine, trifluoromethyl or nitro, and their anhydrous 2,3,4-trione analogs of the formula

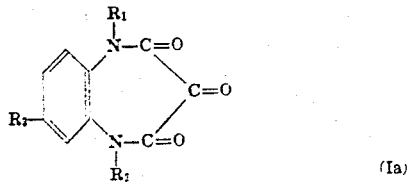

wherein $R_1$, $R_2$ and $R_3$ have the meanings defined above.

The compounds embraced by formula I may be prepared by the following methods:

Method A

By strong oxidation of a 3-(amino-methylidene)-1H-1,5-benzodiazepine-2,4-[3H,5H]-dione of the formula

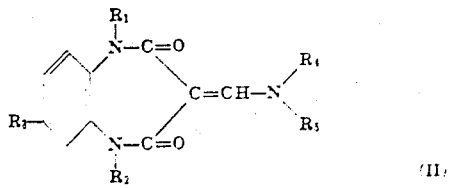

wherein $R_1$, $R_2$ and $R_3$ have the same meanings as in formula I and $R_4$ and $R_5$ are each hydrogen or straight or branched alkyl of preferably one to four carbon atoms, in the presence of an inert organic solvent, such as acetone, dimethylformamide or dimethylsulfoxide, at a temperature between room temperature and the boiling point of the particular solvent which is used, and with an oxidizing agent, such as potassium permanganate or chromic acid.

The starting compounds of the formula II required for this method and a process for their preparation are disclosed in the copending application Ser. No. 221,046 of Karl-Heinz Weber, Adolf Bauer, Peter Danneberg, Klaus Minck and Karl-Heinz Pook entitled "1,5,7-Trisubstituted-3-Hydroxy-1H-1,5-Benzodiazepine-2,4-[3H,5H]-Diones" filed on Jan. 26, 1972.

The process disclosed in said copending application comprises reacting a correspondingly 5,7-disubstituted 1H-1,5-benzodiazepine-2,4-[3H,5H]-dione with a phosphorus pentahalide and a dialkylformamide, which yields a compound of the formula II wherein $R_1$ is hydrogen. Therefore, if it is desired to prepare a compound of the formula I wherein $R_1$ is other than hydrogen by the present method, it is necessary to introduce the desired 1-substituent either before or after the oxidation pursuant to conventional alkylation procedures.

Method B

By oxidizing a 3-hydroxy-1H-1,5-benzodiazepine-2,4-[3H,5H]-dione of the formula

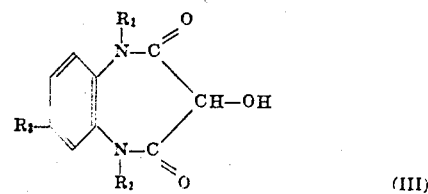

wherein $R_1$, $R_2$ and $R_3$ have the same meanings as in formula I, with an oxidizing agent, such as selenium-dioxide, manganese dioxide, chromic acid or potassium permanganate, in the presence of an inert organic solvent, such as dimethylformamide, dimethylsulfoxide or acetone, at a temperature between room temperature and the boiling point of the particular solvent which is used.

The starting compounds of the formula III required for this method and processes for their preparation are also disclosed in the copending application referred to above.

The end products obtained pursuant to methods A and B are 3,3-dihydroxy compounds corresponding to formula I; they are the hydrate form of the corresponding 2,3,4-trione compounds of the formula I$a$.

A compound of the formula I may readily be converted into the corresponding compound of the formula I$a$ by conventional dehydration methods, such as by subjecting the former to a high vacuum, optionally at moderately elevated temperatures, for several hours.

In those instances where methods A and B yield a compound of the formula I$a$ wherein $R_1$ is hydrogen, this compound may, if desired, be selectively alkylated in accordance with conventional methods, for instance by first forming the corresponding 1-alkali metal salt and then reacting this salt with a conventional alkylating agent, such as an alkyl halide or a dialkyl sulfate.

Likewise, in those instances where methods A and B yield a compound of the formula I$a$ wherein $R_1$ is hydrogen, a hydroxyalkyl group may be introduced into the 1-position by reacting the 1-unsubstituted compound with a corresponding alkyleneoxide in the presence of a strong base, such as a methanolic 35 percent solution of benzyl trimethylammonium hydroxide (Triton B), and optionally of a suitable inert solvent medium, such as a lower alkanol, tetrahydrofuran, dimethylformamide, mixtures thereof or aqueous mixtures thereof. Another method of introducing a hydroxyalkyl group in the 1-position of a compound of the formula Ia wherein R is hydrogen consists of reacting the latter with a corresponding halo-alkanol in the presence of a weak inorganic or organic base, preferably at elevated temperatures; under certain circumstances the presence of an organic solvent, such as an alkanol, is advantageous.

By means of the above-described methods the following end products of the formula I and their anhydrous 2,3,4-trione analogs may be obtained:

7-Chloro-3,3-dihydroxy-5-phenyl-1H-1,5-benzodiazepine-2,4-[3H,5H]-dione,

7-Bromo-3,3-dihydroxy-5-phenyl-1H-1,5-benzodiazepine-2,4-[3H,5H]-dione, 3,3-Dihydroxy-5-phenyl-7-trifluoromethyl-1H-1,5-benzodiazepine-2,4-[3H,5H]-dione, 3,3-Dihydroxy-7-nitro-5-phenyl-1H-1,5-benzodiazepine-2,4-[3H,5H]-dione, 7-Chloro-5-(o-fluoro-phenyl)-3,3-dihydroxy-1H-1,5-benzodiazepine-2,4-[3H,5H]-dione, 7-Bromo-3,3-dihydroxy-1-methyl-5-phenyl-1H-1,5-benzodiazepine-2,4-[3H,5H]-dione, 3,3-Dihydroxy-1-methyl-5-phenyl-7-trifluoromethyl-1H-1,5-benzodiazepine-2,4-[3H,5H]-dione, 7-Chloro-3,3-dihydroxy-1-methyl-5-(o-trifluoromethyl-phenyl)-1H-1,5-benzodiazepine-2,4-[3H,5H]-dione, 5-(o-Chloro-phenyl)-3,3-dihydroxy-1-methyl-7-trifluoromethyl-1H-1,5-benzodiazepine-2,4-[3H,5H]-dione, 5-(p-Chloro-phenyl)-3,3-dihydroxy-1-methyl-7-trifluoromethyl-1H-1,5-benzodiazepine-2,4-[3H,5H]-dione, 7-Bromo-3,3-dihydroxy-5-(o-fluoro-phenyl)-1-methyl-1H-1,5-benzodiazepine-2,4-[3H,5H]-dione, 3,3-Dihydroxy-5-(p-hydroxy-phenyl)-1-methyl-7-trifluoromethyl-1H-1,5-benzodiazepine-2,4-[3H,5H]-dione, 3,3-Dihydroxy-1-methyl-5-(o-nitro-phenyl)-7-trifluoromethyl-1H-1,5-benzodiazepine-2,4-[3H,5H]3,3-Dihydroxy-1-methyl-5-(m-nitro-phenyl)-7-trifluoromethyl-1H-1,5-benzodiazepine-2,4-[3H,5H]-dione, 3,3-Dihydroxy-1-isopropyl-5-phenyl-7-trifluoromethyl-1H-1,5-benzodiazepine-2,4-[3H,5H]-dione, 1-Allyl-3,3-dihydroxy-5-phenyl-7-trifluoromethyl-1H-1,5-benzodiazepine-2,4-[3H,5H]-dione, 7-Chloro-3,3-dihydroxy-1-methyl-5-(α-pyridyl)-1H-1,5-benzodiazepine-2,4-[3H,5H]-dione, 3,3-Dihydroxy-1-methyl-5-(m-trifluoromethyl-phenyl)-7-trifluoromethyl-1H-1,5-benzodiazepine-2,4-[3H,5H]-dione, and 7-Chloro-3,3-dihydroxy-5-(o-trifluoromethyl-phenyl)-1H-1,5-benzodiazepine-2,4-[3H,5H]-dione.

The following examples further illustrate the present invention and will enable others skilled in the art to understand it more completely. It should be understood, however, that the invention is not limited solely to the particular examples given below.

EXAMPLE 1

3,3-Dihydroxy-7-nitro-5-phenyl-1H-1,5-benzodiazepine-2,4-[3H,5H]-dione by method A 13.5 gm of 3-(n-butylamino-methylidene)-7-nitro-5-phenyl-1H-1,5-benzodiazepine-2,4-[3H,5H]-dione were dissolved in 2.3 liters of warm acetone, the resulting solution was acidified with dilute sulfuric acid, and then a solution of 18 gm of potassium permananate in 400 ml of water was added dropwise at a rate such that the temperature of the mixture remained between 20° and 35° C. Thereafter, the batch was allowed to react for 3 to 4 hours more, was then vacuum-filtered through infusorial earth, and the filter cake was washed with acetone. The filtrate was extracted twice with 2.5 liters of methylene chloride each, and the combined extract solutions were dried with magnesium sulfate, vacuum-filtered and evaporated. The crystalline substance which separated out was collected by vacuum filtration and washed with cold methylene chloride, yielding 5.7 gm (66.0 percent of theory) of the compound of the formula

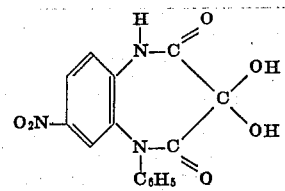

having a melting point of 196° C (decomp.)

EXAMPLE 2

7-Bromo-3,3-dihydroxy-5-phenyl-1H-1,5-benzodiazepine-2,4-[3H,5H]-dione by method A.

10 gm of 7-bromo-3-(n-butylamino-methylidene)-5-phenyl-1H-1,5-benzodiazepine-2,4-[3H,5H]-dione were oxidized with potassium permanganate in acetone as the solvent medium, in a manner analogous to Example 1. The raw product was recrystallized from acetone, yielding 6.2 gm (71 percent of theory) of the compound of the formula

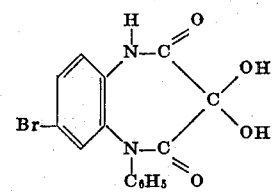

having a melting point of 223° C (decomp.).

EXAMPLE 3

7-Bromo-5-phenyl-1H-1,5-benzodiazepine-2,3,4-[3H,5BV]-trione

The end product obtained in Example 2 was dehydrated by heating it at 60° C for 20 hours in a high vacuum, yielding 5.8 gm (69 percent of theory) of the lemon-yellow compound of the formula

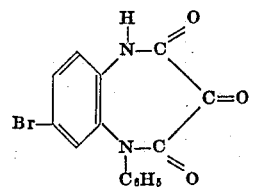

having a melting point of 243° C (decomp.).

EXAMPLE 4

7-Bromo-3,3-dihydroxy-1-methyl-5-phenyl-1H-1,5-benzodiazepine-2,4-[3H,5H]-dione 4 gm of 7-bromo-5-phenyl-1H-1,5-benzodiazepine-2,3,4 [3H,5H]-trione (see preceding example) were dissolved in 200 ml of acetone, 2 gm of sodium methylate were added to the solution, and the resulting mixture was stirred for 20 minutes. Thereafter, 12 ml of methyl iodide were added, and the mixture was stirred at room temperature for 12 hours more. Subsequently, the reaction solution was evaporated in vacuo; the residue, 7-bromo-1-methyl-5-phenyl-1H-1,5-benzodiazepine-2,3,4-[3H,5H]-trione, was admixed with water, and the aqueous mixture was extracted three times with ethyl acetate. The combined organic extracts were dried over magnesium sulfate and evaporated in vacuo, the residue was recrystallized from ether/isopropyl ether, and the virtually pure product was again recrystallized from tetrahydrofuran in the presence of activated charcoal, yielding 2.7 gm (60 percent of theory) of the compound of the formula

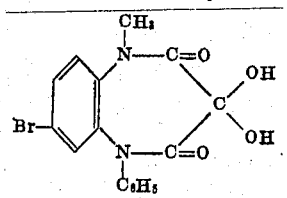

having a melting point of 188°–190° C.

EXAMPLE 5

3,3-Dihydroxy-1-methyl-5-phenyl-7-trifluoromethyl-1H-1,5-benzodiazepine-2,4-[3H,5H]-dione by method A a. 3-(Dimethylamino-methylidene)-1-methyl-5-phenyl-7-trifluoromethyl-1H-1,5-benzodiazepine-2,4-[3H,5H]-dione 5 gm of 3-(dimethylamino-methylidene)-5-phenyl-7-trifluoromethyl-1H-1,5-benzodiazepine-2,4-[3H,5H]-dione were dissolved in 60 ml of N,N-dimethyl-acetamide, 2.5 gm of sodium methylate were added to the solution, and the mixture was stirred for two hours at room temperature. Thereafter, while cooling, 8 ml of methyl iodide were added, and the mixture was stirred overnight at room temperature. Subsequently, the major amount of dimethyl-acetamide was evaporated in vacuo, the residue was admixed with water, the aqueous mixture was vacuum-filtered, the filter cake was washed with water and dissolved in ethyl acetate, the resulting solution was extracted with water, and the organic phase was dried over magnesium sulfate and then vacuum-filtered through infusorial earth in the presence of activated charcoal. The filtrate was then evaporated, and the residue was recrystallized from a small amount of acetone/ether, yielding 4.0 hm (76 percent of theory) of the compound of the formula

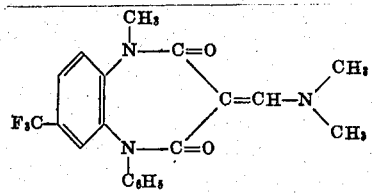

having a melting point of 164°–166° C.

b. 4 gm of 3-(dimethylamino-methylidene)-1-methyl-5-phenyl-7-trifluoromethyl-1H-1,5-benzodiazepine-2,4-[3H,5H]-dione were oxidized with potassium permanganate in acetone, in a manner analogous to that described in Example 1. The reaction product crystallized with 1 mol of water of crystallization. 2.9 gm (77 percent of theory) of the compound of the formula

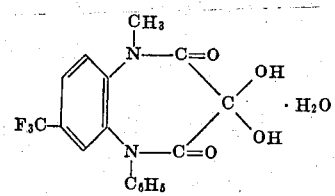

were obtained, having a melting point of 176° C (dec.)

EXAMPLE 6

7-Chloro-3,3-dihydroxy-1-methyl-5-(o-trifluoromethyl-phenyl)-1H-1,5-benzodiazepine-2,4-[3H,5H]-dione by method B 10 gm of 7-chloro-3-hydroxy-1-methyl-5-(o-trifluoromethyl-phenyl)-1H-1,5-benzodiazepine-2,4-[3H,5H]-dione were dissolved in a mixture of 30 ml of dimethylsulfoxide and 300 ml of ethyl acetate, 40 gm of manganese dioxide were added to the solution, and the resulting mixture was stirred for 12 hours at room temperature. Thereafter, the reaction mixture was vacuum-filtered, the filter cake was washed with ethyl acetate, and the filtrate was extracted with water. The organic phase was dried with magnesium sulfate and evaporated in vacuo, and the residue was recrystallized from ether/isopropyl ether, yielding 9.3 gm (89 percent of theory) of the compound of the formula

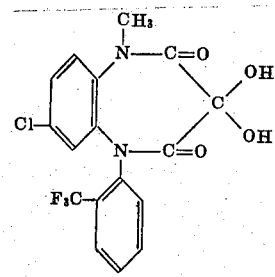

having a melting point of 268°–269° C.

EXAMPLE 7

Using a procedure analogous to that described in Example 3, 5-phenyl-7-trifluoromethyl-1H-1,5-benzodiazepine-2,3,4-[3H,5H]-trione, m.p. 254° C (decomp.), of the formula

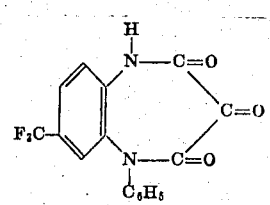

was prepared from 3,3-dihydroxy-5-phenyl-7-trifluoromethyl-1H-1,5-benzodiazepine-2,4-[3H,5H]-dione.

EXAMPLE 8

Using a procedure analogous to that described in Example 1, 3,3-dihydroxy-5-phenyl-7-trifluoromethyl-1H-1,5-benzodiazepine-2,4-[3H,5H]-dione, m.p. 243°–245° C, of the formula

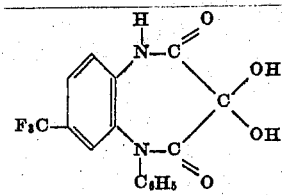

was prepared from 3-(n-butylamino-methylidene)-5-phenyl-7-trifluoromethyl-1H-1,5-benzodiazepine-2,4-[3H,5]-dione.

EXAMPLE 9

Using a procedure analogous to that described in Example 1, 3,3-dihydroxy-5-phenyl-7-chloro-1H-1,5-benzodiazepine-2,4-[3H,5H]-dione, m.p. 190° C (decomp.), of the formula

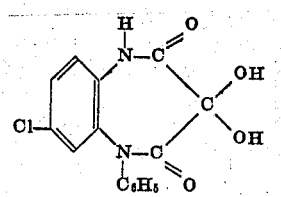

was prepared from 3-(n-butylamino-methylidene)-5-phenyl-7-chloro-1H-1,5-benzodiazepine-2,4-[3H,5H]-dione.

EXAMPLE 10

Using a procedure analogous to that described in Example 6, 1-allyl-3,3-dihydroxy-5-phenyl-7-trifluoromethyl-1H-1,5-benzodiazepine-2,4-[3H,5H]-dione, m.p. 174°–176° C of the formula

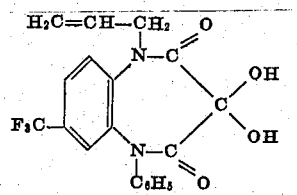

was prepared from 1-allyl-3-hydroxy-5-phenyl-7-trifluoromethyl-1H-1,5-benzodiazepine-2,4-[3H,5H]-dione.

EXAMPLE 11

Using a procedure analogous to that described in Example 6, 1-isopropyl-3,3-dihydroxy-5-phenyl-7-trifluoromethyl-1H-1,5-benzodiazepine-2,4-[3H,5H]-dione, m.p. 177°–178° C, of the formula

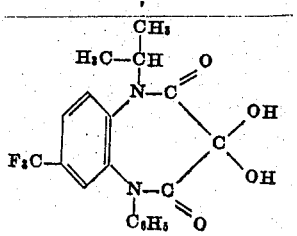

was prepared from 1-isopropyl-3-hydroxy-5-phenyl-7-trifluoromethyl-1H-1,5-benzodiazepine-2,4-[3H,5H]-dione.

EXAMPLE 12

Using a procedure analogous to that described in Example 6, 1-methyl-3,3-dihydroxy-5-(o-chloro-phenyl)-7-trifluoromethyl-1H-1,5-benzodiazepine-2,4-[3H,5H]-dione, m.p. 163° C (decomp.), of the formula

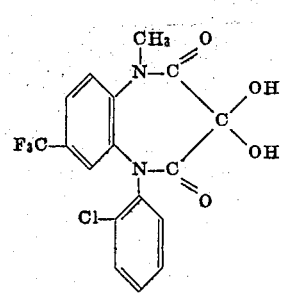

was prepared from 1-methyl-3-hydroxy-5-(o-chloro-phenyl)-7-trifluoromethyl-1H-1,5-benzodiazepine-2,4-[3H,5H]-dione.

EXAMPLE 13

Using a procedure analogous to that described in Example 6, 1-methyl-3,3-dihydroxy-5-(p-hydroxy-phenyl)-7-trifluoromethyl-1H-1,5-benzodiazepine-2,4-[3H,5H]-dione, m.p. 193° C (decomp.), of the formula

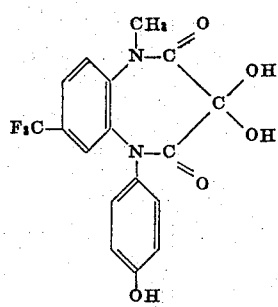

was prepared from 1-methyl-3-hydroxy-5-(p-hydroxy-phenyl)-7-trifluoromethyl-1H-1,5-benzodiazepine-2,4-[3H,5H]-dione.

EXAMPLE 14

Using a procedure analogous to that described in Example 1, 1-methyl-3,3-dihydroxy-5-(o-nitro-phenyl)-7-trifluoromethyl-1H-1,5-benzodiazepine-2,4-[3H,5H]-dione, m.p. 177° C (decomp.), of the formula

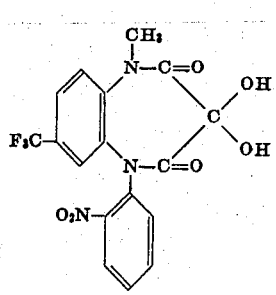

was prepared from 1-methyl-3-(n-butylamino-methylidene)-5-(o-nitro-phenyl)-7-trifluoromethyl-1H-1,5-benzodiazepine-2,4-[3H,5H]-dione.

EXAMPLE 15

Using a procedure analogous to that described in Example 1, 1-methyl-3,3-dihydroxy-5-(α-pyridyl)-7-chloro-1H-1,5-benzodiazepine-2,4-[3H,5H]-dione, m.p. 165° C (decomp.), of the formula

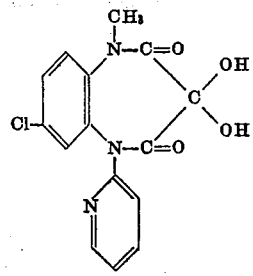

was prepared from 1-methyl-3-(dimethylamino-methylidene)-5-(α-pyridyl)-7-chloro-1H-1,5-benzodiazepine-2,4-[3H,5H]-dione.

EXAMPLE 16

Using a procedure analogous to that described in Example 1, 3,3-dihydroxy-5-(o-fluoro-phenyl)-7-chloro-1H-1,5-benzodiazepine-2,4-[3H,5H]-dione, m.p. 169° C (decomp.), of the formula

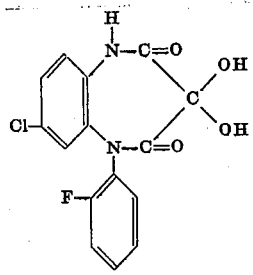

was prepared from 1-H-3-(n-butylamino-methylidene)-5-(o-fluoro-phenyl)-7-chloro-1H-1,5-benzodiazepine-2,4-[3H,5H]-dione.

EXAMPLE 17

Using a procedure analogous to that described in Example 6, 1-methyl-3,3-dihydroxy-5-(p-chloro-phenyl)-7-tri-fluoromethyl-1H-1,5-benzodiazepine-2,4-[3H,5H]-dione, m.p. 193° C (decomp.), of the formula

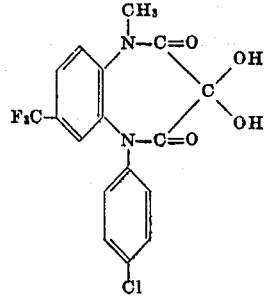

was prepared from 1-methyl-3-hydroxy-5-(p-chloro-phenyl)-7-trifluoromethyl-1H-1,5-benzodiazepine-2,4-[3H,5H]-dione.

EXAMPLE 18

Using a procedure analogous to that described in Example 1, 1-methyl-3,3-dihydroxy-5-(m-trifluoromethyl-phenyl-7-trifluoromethyl-1H-1,5-benzodiazepine-2,4-[3H,5H]-dione, m.p. 130° C (decomp.), of the formula

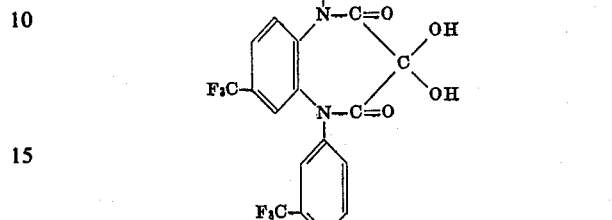

was prepared from 1-methyl-3-(n-butylamino-methylidene)-5-(m-trifluoromethyl-phenyl)-7-trifluoromethyl-1H-1,5-benzodiazepine-2,4-[3H,5H]-dione.

EXAMPLE 19

Using a procedure analogous to that described in Example 1, 1-methyl-3,3-dihydroxy-5-(m-nitro-phenyl)-7-tri-fluoromethyl-1H-1,5-benzodiazepine-2,4-[3H,5H]-dione, m.p. 230° C (decomp.), of the formula

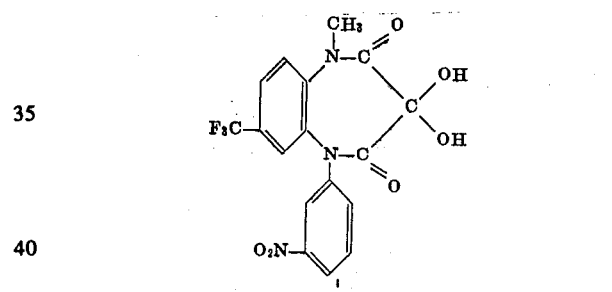

was prepared from 1-methyl-3-(n-butylamino-methylidene)-5-(m-nitro-phenyl)-7-trifluoromethyl-1H-1,5-benzodiazepine-2,4-[3H,5H]-dione.

EXAMPLE 20

Using a procedure analogous to that described in Example 1, 3,3-dihydroxy-5-(o-trifluoromethyl-phenyl)-7-chloro-1H-1,5-benzodiazepine-2,4-[3H,5H]-dione, m.p. 175°–176° C (decomp.), of the formula

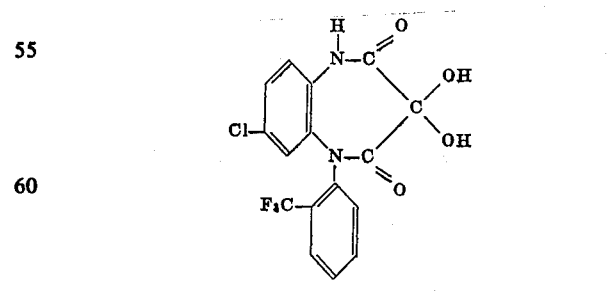

was prepared from 3-(n-butylamino-methylidene)-5-(o-trifluoromethyl-phenyl)-7-chloro-1H-1,5-benzodiazepine-2,4-[3H,5H]-dione.

The compounds according to the present invention, that is, those embraced by formulas I and Ia above, have useful pharmacodynamic properties. More particularly, the compounds of the instant invention exhibit tranquilizing and anticonvulsive activities in warm-blooded animals, such as mice, rats, dogs and minks; their rate of elimination from the body is substantially more rapid than that of presently available tranquilizers, whereby the incidence of possible chronic side-effects is avoided.

Especially effective are those compounds of the formulas I and Ia wherein $R_1$ is hydrogen or methyl, $R_2$ is phenyl, o-trifluoromethyl-phenyl or o-fluoro-phenyl, and $R_3$ is chlorine or bromine.

The compounds of the instant invention are also useful as intermediates for the preparation of their 3-hydroxy analogs, as disclosed in the copending application above referred to.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective tranquilizing and anti-convulsive dosage unit of the compounds according to the present invention is from 0.0083 to 0.84 mgm/kg body weight, preferably 0.0166 to 0.42 mgm/kg body weight, and the daily dose rate is 0.083 to 2.5 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 21

Coated pills

The pill core composition is compounded from the following ingredients:

| | |
|---|---|
| 1-Methyl-3,3-dihydroxy-5-phenyl-7-bromo-1H-1,5-benzodiazepine-2,4-[3H,5H]-dione | 10.0 parts |
| Lactose | 37.5 " |
| Corn starch | 25.0 " |
| Gelatin | 2.0 " |
| Magnesium stearate | 0.5 " |
| Total | 75.0 parts |

Preparation

The benzodiazepine-dione compound is intimately admixed with the lactose and the corn starch, the mixture is moistened with an aqueous 10 percent solution of the gelatin, the moist mass is forced through a 1 mm-mesh screen, the resulting granulate is dried at 40° C and again passed through the screen, the dry granulate is admixed with the magnesium stearate, the composition is compressed into 75 mgm-pill cores which are subsequently coated in conventional manner with a thin shell consisting essentially of a mixture of sugar, titanium dioxide, talcum and gum arabic, and the coated pills are polished with beeswax. Each pill contains 10 mgm of the benzodiazepine-dione compound and is an oral dosage unit composition with effective tranquilizing and anticonvulsive actions.

The same result is obtained when the benzodiazepine-dione compound in the above composition is replaced by one of the following compounds:

3,3-Dihydroxy-5-phenyl-7-bromo-1H-1,5-benzodiazepine-2,4-[3H,5H]-dione; or
7-Chloro-3,3-dihydroxy-1-methyl-5-(o-trifluoromethyl-phenyl)-1H-1,5-benzodiazepine-2,4-[3H,5H]-dione.

EXAMPLE 22

Suppositories

The suppository composition is compounded from the following ingredients:

| | |
|---|---|
| 3-Hydroxy-5-(o-trifluoromethyl-phenyl)-7-chloro-1H-1,5-benzodiazepine-2,4-[3H,5H]-dione | 15 parts |
| Suppository base (e.g., cocoa butter) | 1685 parts |
| Total | 1700 parts |

Preparation

The finely pulverized benzodiazepine-dione compound is blended with the aid of an immersion homogenizer into the suppository base which had previously been melted and cooled to 40° C. 1700 mgm-portions of the composition are poured at 35° C into cooled suppository molds and allowed to harden therein. Each suppository contains 15 mgm of the benzodiazepine-dione compound and is a rectal dosage unit composition with effective tranquilizing and anticonvulsive actions.

Analogous results are obtained when any one of the other benzodiazepine-diones embraced by formula I or an anhydrous 2,3,4-trione analog of the formula Ia is substituted for the particular benzodiazepine-dione in Examples 21 and 22. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

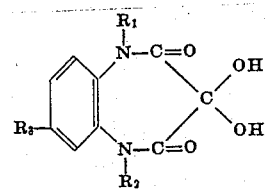

wherein $R_1$ is hydrogen, straight or branched alkyl of one to four carbon atoms, ω-hydroxy-(alkyl of one to four carbon atoms) or allyl, $R_2$ is phenyl, halo-phenyl, hydroxy-phenyl, trifluoromethyl-phenyl, nitro-phenyl or pyridyl, and $R_3$ is fluorine, chlorine, bromine, trifluoromethyl or nitro, or an anhydrous 2,3,4-trione analog thereof of the formula

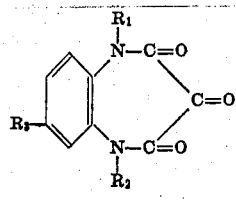

wherein $R_1$, $R_2$ and $R_3$ have the meanings defined above.

2. A compound according to claim 1,
wherein $R_1$ is hydrogen or methyl,
$R_2$ is phenyl, o-fluoro-phenyl or o-trifluoromethylphenyl, and
$R_3$ is chlorine or bromine.

3. A compound according to claim 2, which is 7-bromo-3,3-dihydroxy-1-methyl-5-phenyl-1H-1,5-benzodiazepine-2,4-[3H,5H]-dione or 7-bromo-1-methyl-5-phenyl-1H-1,5-benzodiazepine-2,3,4-[3H,5H]-trione.

4. A compound according to claim 2, which is 7-bromo-3,3-dihydroxy-5-phenyl-1H-1,5-benzodiazepine-2,4-[3H,5H]-dione or 7-bromo-5-phenyl-1H-1,5-benzodiazepine-2,3,4-[3H,5H]-trione.

5. A compound according to claim 2, which is 7-bromo-3,3-dihydroxy-5-(o-fluoro-phenyl)-1-methyl-1H-1,5-benzodiazepine-2,4-[3H,5H]-dione or 7-bromo-5-(o-fluorophenyl)-1-methyl-1H-1,5-benzodiazepine-2,3,4-[3H,5H]-trione.

6. A compound according to claim 2, which is 7-chloro-3,3-dihydroxy-5-(o-trifluoromethyl-phenyl)-1H-1,5-benzodiazepine-2,4-[3H,5H]-dione or 7-chloro-5-(o-trifluoromethyl-phenyl)-1H-1,5-benzodiazepine-2,3,4-[3H,5H]-trione.

* * * * *